Figure 1:
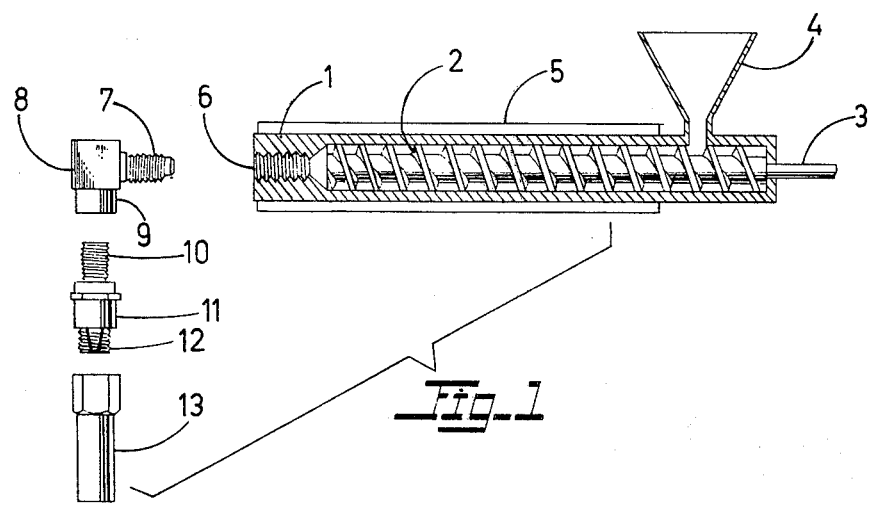

United States Patent [19]
Wuhrmann et al.

[11] 3,909,181
[45] Sept. 30, 1975

[54] EXTRUSION NOZZLE

[75] Inventors: Jean-Jacques Wuhrmann, Vevey; Paul van de Rovaart, Chexbres, both of Switzerland

[73] Assignee: Societe d'Assistance Technique pour Produits Nestle S.A., Lausanne, Switzerland

[22] Filed: Feb. 12, 1974

[21] Appl. No.: 441,768

Related U.S. Application Data

[63] Continuation of Ser. No. 225,770, Feb. 14, 1972, abandoned.

[30] Foreign Application Priority Data
Feb. 19, 1971   Switzerland.................. 2429/71

[52] U.S. Cl. ............................................. 425/461
[51] Int. Cl.² ....................................... B28B 21/52
[58] Field of Search................ 425/461; 222/490; 239/590.5

[56] References Cited
UNITED STATES PATENTS

| | | | |
|---|---|---|---|
| 361,312 | 4/1887 | Muller | 425/461 |
| 807,595 | 12/1905 | Brewer | 285/243 |
| 1,025,133 | 5/1912 | Dunning | 425/461 |
| 1,173,275 | 2/1916 | Igou | 425/461 |
| 1,486,421 | 3/1924 | Dyer | 285/243 |
| 2,767,553 | 10/1956 | Lewis | 239/590.5 |
| 2,937,794 | 5/1960 | Ciliberti | 222/490 |
| 3,241,186 | 3/1966 | Coons, Jr. | 425/461 |
| 3,300,105 | 1/1967 | Rosen | 222/517 |
| 3,528,614 | 9/1970 | Honmann | 239/590.5 |
| 3,758,007 | 9/1973 | Rosen | 239/590.5 |
| 3,794,386 | 2/1974 | Hite | 239/590.5 |

Primary Examiner—Francis S. Husar
Assistant Examiner—Carl Rowold
Attorney, Agent, or Firm—Watson Leavenworth Kelton & Taggart

[57] ABSTRACT

An extrusion nozzle, especially suitable for texturing proteinaceous materials, comprising an elongate body having a side wall defining an axial passage, at one extremity of the body the side wall having longitudinal slits defining at least two fins the free ends of which are turned inwardly towards the longitudinal axis of the passage. Other features of the invention are described in the following specification.

4 Claims, 2 Drawing Figures

U.S. Patent Sept. 30,1975 3,909,181

EXTRUSION NOZZLE

This is a continuation, of application Ser. No. 225,770, filed Feb. 14, 1972, now abandoned.

The present invention is concerned with an extrusion nozzle suitable especially for the shaping of pasty or doughlike proteinaceous materials.

The preparation of food products having a fibrous, meatlike texture, from proteinaceous materials of vegetable, animal or microbial origin, generally involves either spinning or extrusion of the protein material. Extrusion is normally effected with a device comprising a nozzle and means for heating, compressing and advancing the proteinaceous material.

Extrusion devices have been proposed with various types of nozzle of cylindrical or conical shape and having one or more orifices for entry or exit of the material to be extruded. However, the operation of these devices is in practice delicate and the extrusion generally takes place in an irregular manner. The product obtained in these conditions lacks homogeneity and does not always have an acceptable structure.

The present invention is essentially directed to a nozzle permitting a homogeneous, well-structured product to be obtained. The extrusion nozzle according to the invention comprises an elongate body having a side wall defining an axial passage, at one extremity of the body the side wall having longitudinal slits defining at least two fins the free ends of which are turned inwardly towards the longitudinal axis of the passage.

For the preparation of extruded products having a meatlike texture, the nozzle is preferably attached to an extruder of conventional construction comprising a cylindrical barrel provided with heating means, and an auger rotating inside the barrel for advancing the material to be extruded. The upstream end of the barrel, with respect to the direction of movement of the material imparted to it by the auger, is provided with a supply hopper and the nozzle is attached to the downstream end, preferably via a 90° elbow tube. The proteinaceous material, for example defatted soya flour previously moistened by addition of 20 to 60 percent by weight of water is fed into the hopper and drops into the barrel, where it is entrained by the auger which forces it through the elbow and into the nozzle. The rise in temperature brought about by the heating means and by the pressure exercised on the flour transforms it into a dough. When this dough emerges from the nozzle, the pressure drop causes vaporisation of the water so that the extruded product obtained has an expanded fibrous structure.

The nozzle body may be a hollow cylinder or cone and has preferably three fins cut from its wall. The fins are preferably spaced symmetrically around the axis of the nozzle and their free ends are turned inwards and at equal distance from the axis. The median planes of the fins thus meet on the axis of the nozzle at dihedral angles of 120°.

During extrusion, the 90° elbow located between the barrel and the nozzle exercises a braking action on the moving dough, and reduces its tendency to retain the spiral geometry imparted to it by the auger. When the moving dough passes into the nozzle, the turned fins also exercise a braking action with an accompanying rise in pressure. Part of the rope of dough emerges from the central part of the nozzle, that is between the ends of the turned fins, and the outer part of the rope of dough is expelled through the longitudinal slits and rejoins the central rope. This lateral expulsion of part of the dough allows the effects of growing pressure to be limited and ensures an excellent regularity in the output from the extruder. The resulting product is in the form of a fibrous expanded cylinder the surface of which has longitudinal ribs, the angular distribution of these ribs corresponding to the longitudinal slits of the nozzle.

If desired, a cylindrical tube may be mounted downstream of the nozzle, with the upstream end overlapping the longitudinal slits of the nozzle. The effect of the tube is to give to the extruded product a smooth surface, without ribs. The open end of the tube may be flattened so as to obtain the extruded product in the form of a ribbon.

The braking action on the dough, obtained by mounting a 90° elbow between the extruder barrel and the nozzle, may also be secured by connecting two of the nozzles according to the invention, in series, directly to the barrel. The first nozzle, connected to the barrel, may have two or three fins preferably disposed symmetrically around its axis. The second, or downstream nozzle, is preferably connected to the first by a cylindrical tube a part of which overlaps the longitudinal slits of the first nozzle. The second nozzle may have three or four fins. During extrusion, the dough emerging from the first nozzle is gathered by the connecting tube and is forced through the second, to which a further tube, overlapping its slits, may be attached. As described previously, the open end of the tube may be round or flattened.

The nozzle according to the invention may be used for the extrusion of various pasty or dough-like masses. It is especially suited for the preparation of textured products from proteinaceous materials having a fibrous expanded structure obtained by extruding a heated, water-containing dough with a substantial pressure drop across the nozzle. Whilst it is preferred that the fins be disposed symmetrically with respect to the nozzle axis, asymmetric arrangements may also be provided if it is desired to produce extruded products having particular desired shapes.

Figure 2:
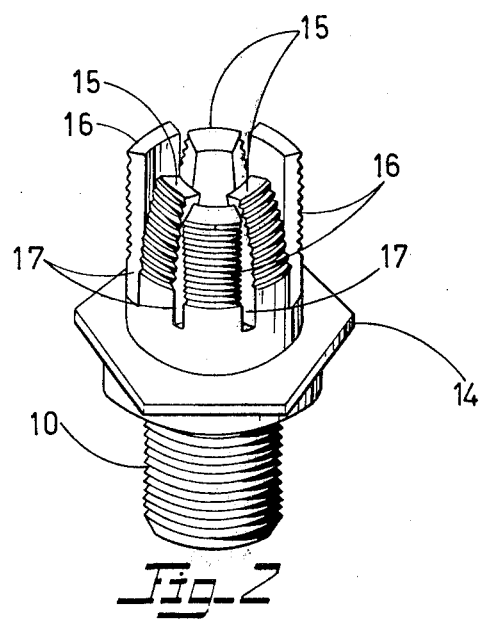

The invention is further illustrated by the accompanying drawings, in which:

FIG. 1 is a schematic exploded view of an extrusion apparatus including a nozzle according to the invention; and FIG. 2 is a view in perspective of the nozzle shown in FIG. 1.

Referring to FIG. 1, the apparatus comprises an extruder including a cylindrical barrel 1 in which turns an auger 2 having a shaft 3 rotated by a motor (not shown). The barrel 1 is provided with a supply hopper 4 and heating means 5. The downstream end of the barrel 1 has an internally threaded exit orifice 6 into which is screwed the externally threaded arm 7 of the elbow 8. The downstream arm 9 of the elbow 8 has an internal thread into which is screwed the upstream threaded part 10 of the nozzle 11. A tube 13 threaded internally at its upstream end is screwed onto the cylindrical sections of the downstream end 12 of the nozzle 11.

The nozzle 11, as shown in FIG. 2, comprises a hexagonal central flange 14 which facilitates the screwing together of the various elements of the device. The downstream end 12 has three turned identical fins 15, symmetrically spaced around, and having ends equidistant from the axis of the nozzle. These fins 15 are separated from the sections 16 of the cylindrical wall by longitudinal slits 17.

We claim:

1. An extrusion nozzle for extruding proteinaceous material in a doughlike mass thereof, said nozzle comprising an elongated body having a cylindrical wall portion enclosing space defining an axial passage, and an even numbered plurality of fins of arcuate cross section extending longitudinally from said cylindrical wall portion, said fins being circularly spaced about the longitudinal axis of said passage, tip end portions of alternate ones of said fins being turned inwardly relative to the remaining fins toward said longitudinal axis, said remaining fins extending in substantially straight disposition from said cylindrical wall portion.

2. An extrusion nozzle according to claim 1 in which the nozzle has six fins.

3. An extrusion nozzle according to claim 1 in which said alternate ones of said fins are disposed symmetrically spaced around said axis.

4. An extrusion nozzle according to claim 1 in which the tip end portions of said alternate ones of said fins are turned inwardly towards said axis to an extent that said tip ends are substantially equidistant from said axis.

* * * * *